United States Patent [19]

Yamada et al.

[11] Patent Number: 4,556,807
[45] Date of Patent: Dec. 3, 1985

[54] PRESSURE TRANSDUCER WITH TEMPERATURE COMPENSATION CIRCUIT

[75] Inventors: Kazuji Yamada; Hideo Sato, both of Hitachi; Kazuo Kato, Ibaraki; Takao Sasayama, Hitachi; Kanji Kawakami, Katsuta; Ryosaku Kanzawa, Hitachi, all of Japan

[73] Assignee: Hitachi, Ltd., Tokyo, Japan

[21] Appl. No.: 522,227

[22] Filed: Aug. 11, 1983

[30] Foreign Application Priority Data

Aug. 16, 1982 [JP] Japan ............................... 57-141067

[51] Int. Cl.$^4$ .............................................. G01L 9/06
[52] U.S. Cl. .................................... 307/491; 307/297; 307/310; 73/708; 338/3; 323/907
[58] Field of Search ................. 73/708, 720, 721, 726, 73/727; 307/491–493, 297, 308, 310; 323/312–314, 907; 338/3, 4

[56] References Cited

U.S. PATENT DOCUMENTS

| | | | |
|---|---|---|---|
| 4,000,643 | 1/1977 | Pearson | 73/708 X |
| 4,079,308 | 3/1978 | Brown | 323/314 |
| 4,233,848 | 11/1980 | Sato et al. | 73/708 X |
| 4,325,018 | 4/1982 | Schade, Jr. | 323/313 |
| 4,355,537 | 10/1982 | vander Have | 73/708 |
| 4,446,527 | 5/1984 | Runyan | 73/708 X |
| 4,463,274 | 7/1984 | Swartz | 307/491 |

FOREIGN PATENT DOCUMENTS

| | | | |
|---|---|---|---|
| 0037906 | 3/1980 | Japan | 73/708 |
| 0063227 | 5/1981 | Japan | 73/708 |

OTHER PUBLICATIONS

Cattaneo et al., "The Industrial Application of the Piezoresistive Effect: A Low Cost Thick–Film Pressure Sensor", Proceedings of the 30th Electronic Components Conference, San Francisco, CA, USA, Apr. 28–30, 1980, pp. 429–435.

Primary Examiner—Stanley D. Miller
Assistant Examiner—D. R. Hudspeth
Attorney, Agent, or Firm—Antonelli, Terry & Wands

[57] ABSTRACT

A pressure transducer is disclosed comprising a pressure sensor portion having gage resistors in bridge formed on a thin diaphragm of a semiconductor substrate, and a power supply connected to the pressure sensor portion for driving the pressure sensor. The power supply includes a first current source for supplying a temperature-dependent current equivalent to the sum of a current almost proportional to the absolute temperature and a current independent of temperature, and a second current source for sinking the current almost proportional to the temperature characteristic of the gage resistors from the current of the first current source. A temperature compensation circuit is additionally provided to drive the bridge circuit by the difference between the temperature-dependent current and the current proportional to the temperature characteristic in a constant-current driving mode, and by a voltage proportional to the current difference when the output of the bridge circuit is connected to an amplifier whose gain is dependent on temperature.

5 Claims, 13 Drawing Figures

PRESSURE TRANSDUCER WITH TEMPERATURE COMPENSATION CIRCUIT

The present invention relates to a pressure transducer or more in particular to a pressure transducer comprising a bridge circuit making up a pressure sensing section and a temperature compensation circuit integrated with each other.

A semiconductor pressure transducer is known in which a thin diaphragm is formed at the central part of a silicon monolithic crystal plate, a plurality of gage resistors each made of an impurities diffusion layer are provided on the surface of the diaphragm in the form of a bridge circuit. In recent years, another type of semiconductor pressure transducer has become known, in which a circuit for temperature compensation of the sensitivity of the transducer or an amplifier circuit is integrated on the diaphragm or the surrounding thick portion of the pressure sensing section.

A semiconductor pressure transducer has a sensitivity which decreases with an increase of temperature, and hence it requires temperature compensation. To the end, what is called an $nV_{BE}$ network is used sometimes as a temperature compensation circuit, as disclosed in U.S. Pat. No. 3,836,796 issued Sept. 17, 1974 to James E. Solomon et al and entitled "Semiconductor Pressure Transducer Employing Novel Temperature Compensation Means". The $nV_{BE}$ network utilizes the characteristic of the base-emitter voltage $V_{BE}$ of a transistor which decreases with an increase of temperature, and operates in such a manner that a series connection of the bridge circuit making up a pressure sensing section and the $nV_{BE}$ network is energized by a constant voltage source, and the voltage applied to the bridge circuit is increased by the decrement of $V_{BE}$ of the $nV_{BE}$ network caused by a temperature increase, thus compensating for the decrease in sensitivity of the bridge circuit. In the temperature compensation circuit using the $nV_{BE}$ network, however, the voltage $V_{BE}$ of the transistor is determined by the collector current but is not affected by the change of the source voltage, and therefore the amount of temperature compensation remains substantially constant with a change of the source voltage. Since the sensitivity of the bridge circuit is proportional to the source voltage, on the other hand, compensation is insufficient when the source voltage increases, while an excessive compensation occurs when the source voltage drops. In order to prevent this inconvenience, the above U.S. Patent uses a voltage regulator circuit including another $nV_{BE}$ network as an additional temperature compensation circuit.

The object of the present invention is to provide a pressure transducer comprising a temperature compensation circuit which, by obviating the disadvantage of short or excessive amount of compensation caused by the variation of the source voltage of conventional temperature compensation circuits as mentioned above, is capable of accurate temperature compensation for variations of the source voltage.

In order to achieve this object, according to the present invention, there is provided a pressure transducer having a temperature compensation circuit whose temperature compensation function is obtained by using a current changing in non-linear manner with variation of temperature, in view of the fact that the pressure-responsive output voltage of a bridge circuit of gage resistors and driven by a constant current undergoes a non-linear change with variation of temperature, wherein the non-linear current is obtained by subtracting a sink current having temperature characteristic proportional to the temperature characteristic of the gage resistors from a source current having a component proportional to temperature and the bridge circuit is driven by the non-linear current when it is arranged to be driven in the constant current mode and by a voltage proportional to the non-linear current when arranged to be driven in the constant voltage mode.

The features and advantages of the present invention will be more clearly understood from the following description of preferred embodiments of the present invention with reference to the accompanying drawings, in which.

Figure 1A:
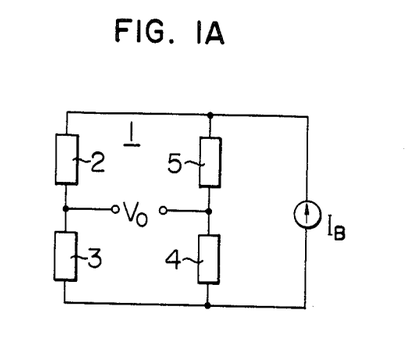
FIGS. 1A and 1B are diagrams for explaining the temperature characteristic of the sensitivity of a semiconductor pressure transducer with no temperature compensation.
Figure 1B:
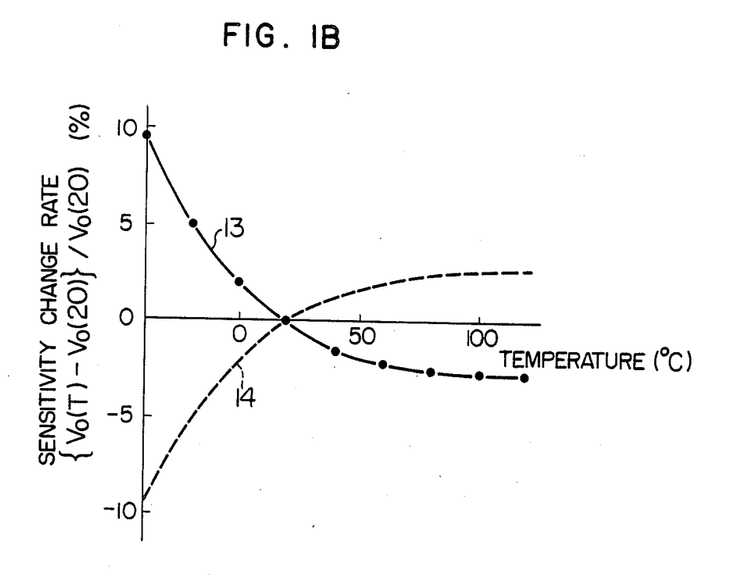

Prior to explaining embodiments of the present invention, the temperature characteristic of sensitivity of a semiconductor pressure transducer having no temperature compensation will be described quantitatively. FIG. 1A shows the sensor portion 1 of a semiconductor pressure transducer including the gage resistors 2, 3, 4 and 5 in bridge formed by diffusion on the surface of a diaphragm and driven by a constant current $I_B$. The bridge output obtained in a given pressure range, namely, the sensor sensitivity exhibits a temperature-dependent characteristic. FIG. 1B shows a graph of the characteristic in which the ordinate represents the sensitivity change rate expressed by an equation below.

$$\frac{V_0(T) - V_0(20)}{V_0(20)} \times 100 \, (\%) \tag{1}$$

where $V_0(T)$ is the bridge output at temperature T, and $V_0(20)$ the bridge output at the reference temperature of 20° C. In the graph, the curve 13 represents the result of measurement. This characteristic somewhat depends on the impurity concentration of the gage resistors or the thermal stress of the silicon diaphragm. In any way, the sensitivity is higher at lower temperatures and lower at higher temperatures for a bridge circuit made of usual impurity concentration. In order to compensate for this temperature characteristic, it is necessary to form the temperature characteristic of the drive current $I_B$ as shown by the curve 14 in the drawing. For example, when the sensitivity is increased at low temperatures, the drive current is desirably reduced to maintain the output at a constant level. It is known to obtain such a drive current characteristic by a circuit comprising a fixed resistor and a thermistor having a temperature-dependent characteristic. However, such a circuit cannot be applied to the present invention since it is impossible to form the thermistor on the same chip as the semiconductor pressure transducer. Specifically, the thermistor is required to change in temperature in the same manner as the gage resistors, and it is practically difficult to cause the thermistor, which cannot be formed on the same chip as the gage resistors, to develop the same temperature variation as that of the gage resistors, thus making the application of the above-mentioned circuit to the present invention difficult. It may be considered, therefore, to use an active element such as a transistor which can be formed on the same chip as the gage resistors. Since the temperature characteristic of the transistor is considerably limited, however, it is also difficult to obtain the required temperature characteristic solely by the transistor. According to the present invention, the current proportional to the absolute temperature, the current independent of temperature, and the current proportional to the temperature coefficient of the resistor are produced by using the transistor temperature characteristics and these currents are combined to produce a current having the characteristic as shown by the curve 14 of FIG. 1B.

Figure 2A:
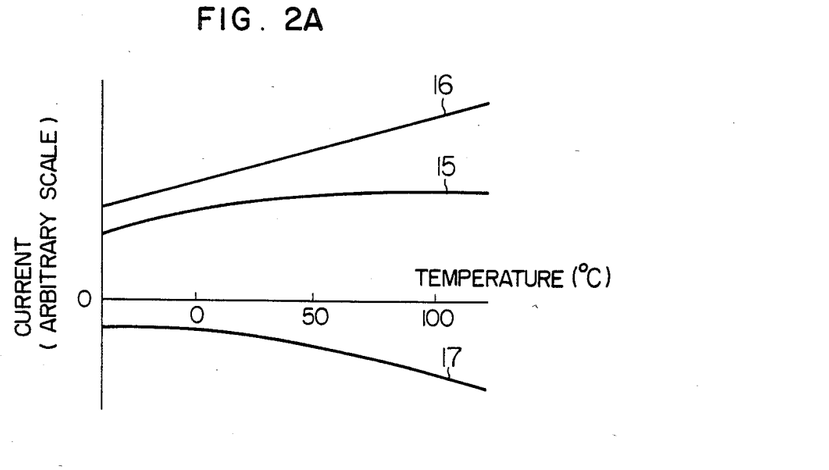
FIGS. 2A and 2B are diagrams for explaining the fundamental principle of the present invention.
Figure 2B:
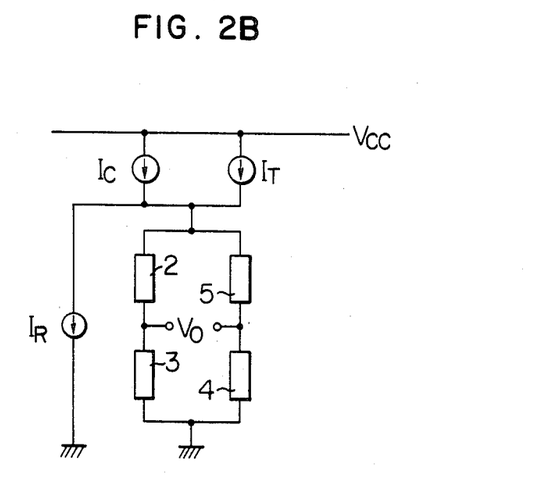

Now, the fundamental principle of the present invention will be explained with reference to FIG. 2A. In FIG. 2A, the abscissa represents the temperature, and the ordinate an arbitrary scale of current to indicate the temperature characteristics of various current sources used in the present invention. The curve 15 corresponds to the curve 14 in FIG. 1B, and represents the temperature characteristic of the bridge drive current $I_B$ for producing the desired temperature characteristic. If the curve 15 is represented by a term of the sensitivity change rate with reference to a value at 20° C., the curve 14 in FIG. 1B will be obtained. In order to obtain the current $I_B$ of the curve 15, the current $I_R$ shown by the curve 17 proportional to the temperature characteristic of the gage resistors is subtracted from the sum of the current $I_T$ proportional to the absolute temperature of curve 16 and the constant current $I_C$ independent of the temperature. Since the temperature characteristic of the gage resistor undergoes a small change at lower temperatures and a large change at higher temperatures, a curved characteristic as shown by the curve 15 is obtained. In order to obtain the currents of the above-mentioned characteristics, an equivalent circuit as shown in FIG. 2B may be used. In the drawing, the current $I_T$ proportional to the absolute temperature T and the current $I_C$ independent of temperature are used as a source and the current $I_R$ proportional to the temperature characteristic of the gage resistors is used as sink, so that the bridge made up of the gage resistors 2, 3, 4 and 5 may be supplied with the current $I_B$ shown by curve 15 in FIG. 2A.

Figure 3:
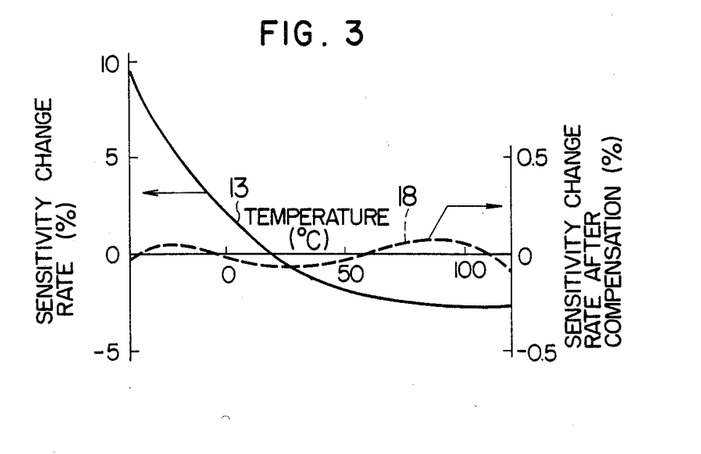
FIG. 3 is a graph showing the temperature characteristic obtained by computer simulation of a semiconductor pressure transducer constructed on the principle of the present invention.

Assuming that the circuit of FIG. 2B is realized, the effect of temperature compensation of the bridge circuit as simulated by computer is shown in FIG. 3. In the diagram, the curve 13 represents the temperature characteristic of the sensitivity of the bridge circuit, namely, the sensor portion having no temperature compensation, while the curve 18 represents the temperature characteristic of the sensitivity obtained when the compensation circuit of FIG. 2B is operated theoretically. In this simulation, the bridge drive current $I_B$, the current $I_T$ proportional to absolute temperature and the current $I_R$ proportional to the temperature characteristic of the resistor are set to 1 mA, 0.9 mA and 1.6 mA respectively at a reference temperature of 20° C., and the current $I_C$ independent of temperature to 1.7 mA. As seen from curve 18, the sensitivity changes within a range of ±0.1% with the temperature change between −40° and 120° C. if the circuit of FIG. 2B operates ideally.

Figure 4A:
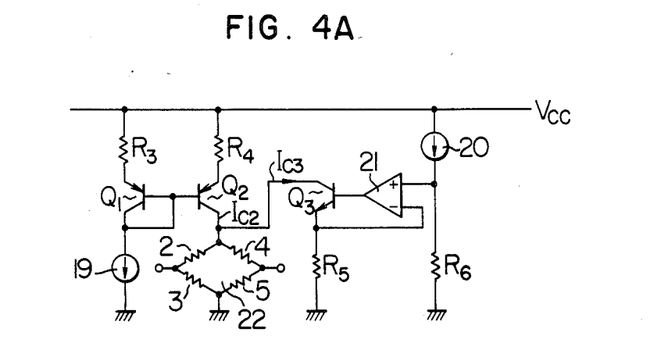
FIGS. 4A, 4B and 4C are diagrams showing a circuit configuration of a pressure transducer according to an embodiment of the present invention.

An embodiment of the present transducer according to the present invention will be described with reference to FIGS. 4A to 4C. The circuit including transistors $Q_1$ and $Q_2$, resistors $R_3$ and $R_4$ substantially zero in temperature coefficient, and a constant current source 19 is generally used for integrated circuits as constant current source, in which the collector current $I_{C2}$ of the transistor $Q_2$ is the sum of $I_T$ and $I_C$, namely, the current proportional to temperature plus the constant current in FIG. 2B. A circuit made up of a transistor $Q_3$, a constant current source 20, an amplifier 21, a resistor $R_5$ substantially independent of temperature, and a resistor $R_6$ having a temperature coefficient substantially equal to the gage resistors making up the sensor bridge 22, produces a constant sink current $I_{C3}$ having almost the same temperature coefficient as the current $I_R$ shown in FIG. 2B, namely, the gage resistors. This circuit makes it possible to supply the current $I_T+I_C-I_R$ to the bridge 22.

Figure 4B:
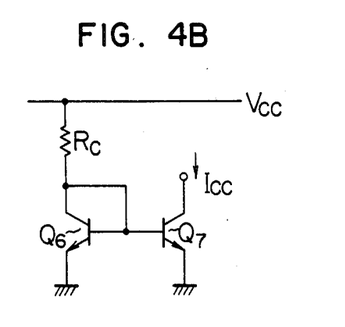
Figure 4C:
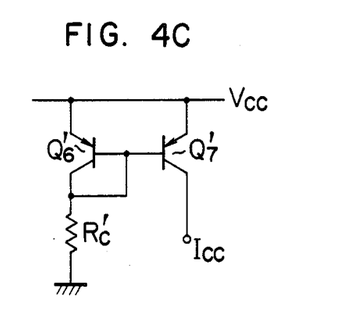

The constant current source 19 may use a well-known circuit such as a circuit including transistors $Q_6$, $Q_7$ and a resistor $R_C$ substantially zero in temperature coefficient, as shown in FIG. 4B, in which the collector of the transistor $Q_7$ is connected to the collector of transistor $Q_1$. A circuit as shown in FIG. 4C may be used for the constant current source 20 in which the collector of the transistor $Q'_7$ is connected to the resistor $R_6$.

Figure 6:
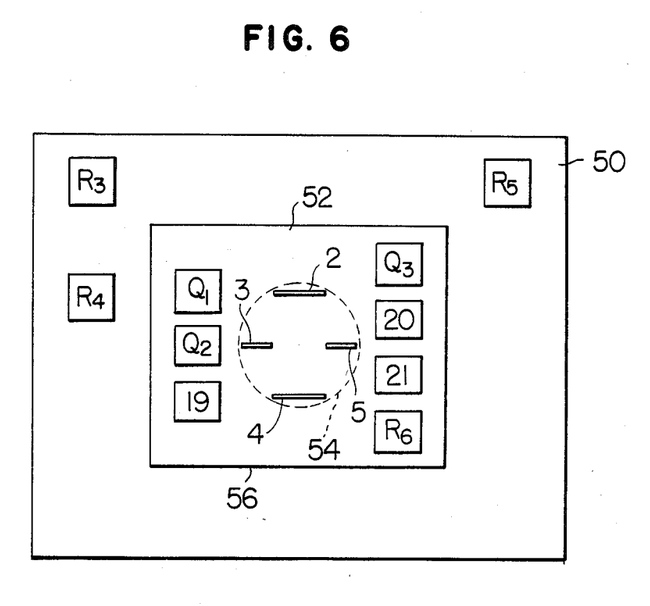
FIG. 6 is a schematic view showing a general construction of a pressure transducer according to the present invention.

The elements constituting the circuit of FIG. 4A are arranged on a ceramic plate 50 in such a manner as shown in FIG. 6. In FIG. 6, reference numeral 52 designates a rectangular semiconductor substrate including a circular thin diaphragm 54 formed at the central part of the back thereof, and a peripheral portion 56 making up a thin support. The substrate 52 is fixedly fitted in the opening formed at substantially the central part of the plate 50, and the pressure to be measured is introduced to the diaphragm 54 by an appropriate pressure introducer (not shown). Among the elements making up the circuit of FIG. 4A, the gage resistors 2, 3, 4 and 5 are formed by diffusion on the diaphragm 54, and the transistors $Q_1$, $Q_2$ and $Q_3$, the resistor $R_6$, the constant current sources 19 and 20, and the amplifier 21 are also formed by diffusion on the peripheral portion 56. The fixed resistors $R_3$, $R_4$ and $R_5$ are made in the form of thick film resistors. These elements are connected to each other by appropriate wiring (not shown) to make up the circuit of FIG. 4A. The resistors $R_3$, $R_4$ and $R_5$ may alternatively be integrated as thin film resistors on the peripheral portion 56 of the semiconductor substrate 52.

Reference is made again to FIG. 4A. In the circuit for producing a current proportional to temperature, the emitter areas of the transistors $Q_1$ and $Q_2$ are adjusted to provide the output current $I_{C2}$ with temperature characteristic positively. Generally, in order to produce an output current larger than the constant current source 19, the emitter area of the transistor $Q_2$ is made larger as compared with that of the transistor $Q_1$. If the saturation current for unit emitter area is equal for both transistors, the total saturation current ratio is proportional to the ratio of areas. Assuming that the current amplification factor $\beta$ of the transistors is infinite, the following equations are satisfied $$I_{ref_1} R_\beta + \frac{kT}{q} \ln \cdot \frac{I_{ref_1}}{I_{C2}} \cdot \gamma - I_{C2} \cdot R_4 = 0 \quad (2)$$

$$I_{C2} = I_{ref_1} \frac{R_3}{R_4} + \frac{kT}{qR_4} \ln \frac{I_{ref_1}}{I_{C2}} \cdot \gamma \quad (3)$$

where $I_{ref_1}$ is the current supplied from the constant current source 19, k Boltzmann factor, q the charges, and $\gamma$ the ratio of emitter areas. In the current $I_{C2}$ determined by equation (3) above, the first term approximately represents the constant current and the second term the current proportional to the absolute temperature. As seen from the equation (3), the effect of temperature on the current $I_{C2}$ is increased by decreasing the current $I_{C2}$, and decreased by increasing the current $I_{C2}$. By adjusting the current $I_{C2}$, it is possible to obtain a current having a temperature characteristic as shown by the curve 16 in FIG. 2A.

On the other hand, the collector current of the transistor $Q_3$ gives the sink current. That is, assuming that the amplification factor of the amplifier 21 is infinitely large, the voltage across the resistor $R_6$ produced by the current of the constant current source 20 is equal to the voltage across the resistor $R_5$ and the voltage across the resistor $R_5$ is proportional to the collector current $I_{C3}$ of the transistor $Q_3$ so that the current $I_{C3}$ becomes proportional to the temperature characteristic of the gage resistors if the resistor $R_6$ is formed through the same process as the gage resistors. Thus, a current of the curve 17 shown in FIG. 2A is realized in this manner so that a current of the curve 15 is supplied to the bridge circuit.

Figure 5:
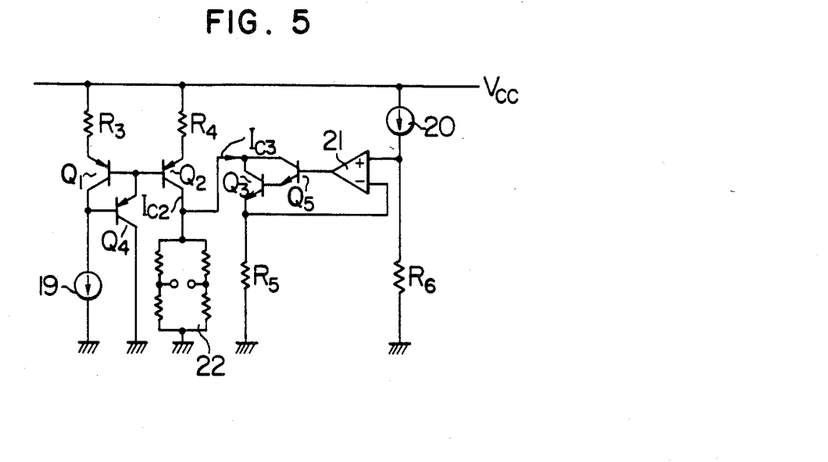
FIG. 5 is a diagram showing the circuit configuration of another embodiment.
Figure 7:
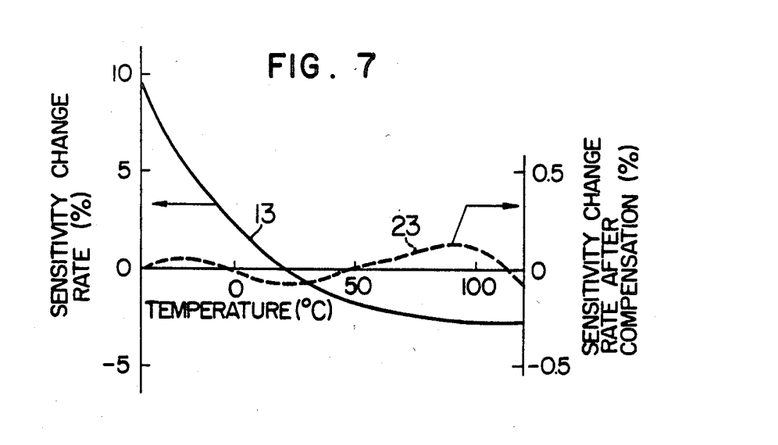
FIG. 7 is a graph showing the temperature characteristic of the pressure transducer of FIG. 4A.

The circuit of FIG. 4A may have a disadvantage in that the temperature compensation characteristic is varied with deviation of the value of $\beta$ in the course of manufacture if the current amplification factor $\beta$ of the transistor is limited. If $\beta$ is made substantially constant, the circuit of FIG. 4A is sufficient, but it is common practice to design the circuit so as to allow variation of $\beta$ in a certain range. A circuit compensating for variation of $\beta$ is shown in FIG. 5. The current source proportional to the temperature includes an additional transistor $Q_4$, so that the effect on the base current of the transistors $Q_1$ and $Q_2$ is compensated for by the transistor $Q_4$. In the current source proportional to the temperature characteristic of the resistors, on the other hand, the transistors $Q_3$ and $Q_5$ are arranged in Darlington connection. The sensitivity compensation characteristic obtained by this circuit is shown in FIG. 7. The axes and the curve 13 are coincident with those in FIG. 3. The compensation characteristic is shown by curve 23. Over the entire temperature range, it is seen that the sensitivity error is confined to about ±0.1% or less.

Figure 8A:
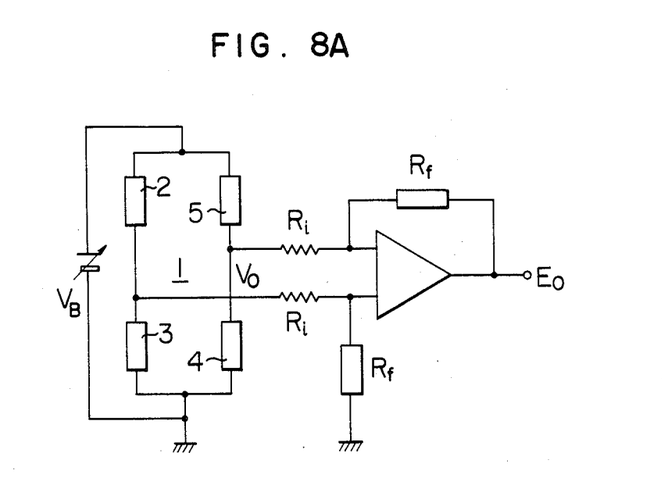
FIGS. 8A and 8B are diagrams for explaining the circuit configuration of still another embodiment of the present invention.
Figure 8B:
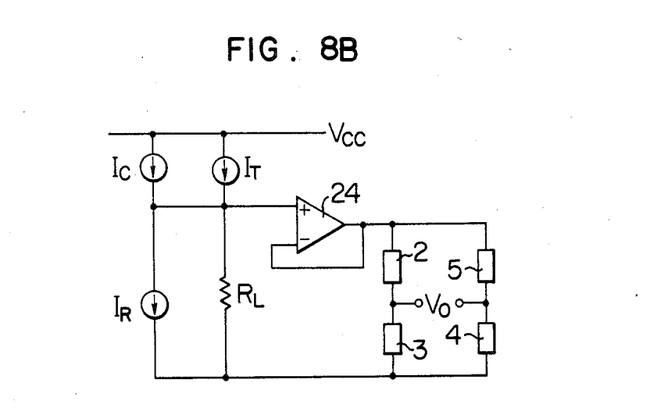

Explanation was made above of the present invention as applied to a bridge circuit driven by constant current. Apart from this, the present invention may be used for temperature compensation of a bridge circuit in the constant voltage mode, when the bridge circuit is connected to an amplifier as shown in FIG. 8A, in which $R_i$ designates a resistor independent of temperature, and $R_f$ a diffusion resistor formed by the same process as the gage resistors 2, 3, 4 and 5. Hence, the resistor $R_f$ is subjected to the influence of temperature to the same degree as that for the gage resistors 2, 3, 4, and 5. Thus, the gain of the amplifier is also dependent on the temperature. In this case, the bridge resistance load is required to be supplied with a constant voltage having a temperature characteristic as shown by the curve 14 in FIG. 1B. This is achieved by replacing the above-mentioned constant current source with a constant voltage source and therefore is easily realized by the construction shown in FIG. 8B. Character $R_L$ designates a fixed resistor made of a thick film independent of temperature and numeral 24 an amplifier.

All the circuits described above are suitable for integration and may be integrated easily with the sensor portion of the gage resistors as shown in FIG. 6. Further, these circuits, which are basically comprised of constant current circuits are not substantially affected by the variations as large as 10% of the voltage source $V_{CC}$. Also, in the case where the amplifier circuit for bridge output is integrated on the same chip, the compensation circuit may be constructed in the same process as the amplifier circuit. Furthermore, since a current source of the current proportional to the temperature characteristic of the resistors is made of elements produced in the same process as the gage resistors, variation, if any, of the impurity concentration of the gage resistors causes a similar change of the characteristic of the compensation circuit, thereby leading to the advantage of a less effect of the process variations.

Although the active elements of the compensation circuit described above are most effective when arranged on the same chip as the gage resistors as shown in FIG. 6, the advantage of the present invention is sufficiently obtained also if they are disposed proximate the gage resistors on a separate chip.

We claim:

1. A pressure transducer comprising:
   a semiconductor substrate including a thin diaphragm;
   a pressure sensor portion including a bridge connection of gage resistors formed on said diaphragm;
   a first current source connected to said pressure sensor portion and making up a power supply for driving said pressure sensor portion, said first current source supplying a current equivalent to the sum of a current substantially proportional to the absolute temperature and a current independent of temperature; and
   a second current source for sinking the current substantially proportional to the temperature characteristic of said gage resistors from said first current source.

2. A pressure transducer according to claim 1, wherein said first current source includes first and second transistor circuits connected in parallel with each other, and a constant current source connected in parallel with said parallel connection of said first and second transistor circuits, the ratio of emitter areas of said first and second transistors being adjusted in accordance with the temperature characteristic required of the current to be supplied by said first current source.

3. A pressure transducer according to claim 2, wherein said second current source includes a second constant current source connected in series with a temperature-dependent resistor having the same temperature characteristic as said gage resistors, and a third transistor for producing a current proportional to the voltage across said temperature-dependent resistor.

4. A pressure transducer according to claim 1, wherein said bridge circuit is arranged to be driven by constant current, and the current obtained by sinking the current of said second current source from said first current source is directly supplied to said bridge circuit.

5. A pressure transducer according to claim 1, wherein an output of said bridge circuit is connected to an amplifier whose gain is dependent on temperature, said apparatus further comprising a resistor independent of temperature which is supplied with a current obtained by sinking the current of said second current source from the current of said first current source, and means for driving the bridge circuit by the voltage across said resistor independent of temperature.

* * * * *